United States Patent [19]

Hara et al.

[11] Patent Number: 5,175,414

[45] Date of Patent: Dec. 29, 1992

[54] METHOD AND APPARATUS FOR REPAIRING GLASS-LINED EQUIPMENT BY SOL-GEL PROCESS

[76] Inventors: Tatsuo Hara, 6-4-10-101, Sumiyoshi-miyamachi, Higashinada-ku, Kobe 658; Koichi Wada, 2-112, Jiyugaoka-honmachi, Miki 673-04; Shigeo Uegaki, 3-8-28, Fukae-honmachi, Higashinada-ku, Kobe 658, all of Japan

[21] Appl. No.: 707,621

[22] Filed: May 30, 1991

Related U.S. Application Data

[62] Division of Ser. No. 529,935, May 29, 1990, Pat. No. 5,053,251.

[30] Foreign Application Priority Data

May 26, 1989 [JP] Japan ................... 1-134255

[51] Int. Cl.$^5$ ............................. H05B 1/02; F24J 3/00
[52] U.S. Cl. .................................. 219/528; 219/535; 432/5; 432/225
[58] Field of Search ............... 432/224, 225, 226, 4.5, 432/10; 219/535, 528

[56] References Cited

U.S. PATENT DOCUMENTS

| | | | |
|---|---|---|---|
| 4,149,066 | 4/1979 | Niibe | 219/528 |
| 4,212,629 | 7/1980 | Nagasaka et al. | 432/225 |
| 4,281,238 | 7/1981 | Noma et al. | 219/535 |
| 4,486,649 | 12/1984 | Lane, Jr. | 219/535 |
| 4,506,138 | 3/1985 | Bennett et al. | 219/535 |
| 4,586,896 | 5/1986 | Smith | 432/5 |
| 4,827,103 | 5/1989 | Asp | 219/528 |
| 4,918,292 | 4/1990 | Nussbaum et al. | 219/535 |
| 4,937,435 | 6/1990 | Goss et al. | 219/528 |

*Primary Examiner*—Henry C. Yuen
*Attorney, Agent, or Firm*—Marshall, O'Toole, Gerstein, Murray & Bicknell

[57] ABSTRACT

A method of repairing a damaged portion of a glass layer of glass-lined steel equipment by repeated steps of applying a repair agent to a damaged area of the glass layer and then heating the repair agent for solidification and adherence to the glass by the use of a sol-gel process, until a thickness of a repair glass layer becomes almost equal to the existing glass layer adjacent thereto without generating cracks or exfoliations in the glass. Also, an apparatus for heating the repair area of a layer of glass-lined steel equipment includes a flexible thermal insulation sheet body having a recess on a single side thereof; electric heater units provided in the recess for emitting far infrared rays; magnets provided adjacent to the recess for securing the sheet body on a wall of glass-lined equipment covering the damaged portion to be repaired; a silica glass cloth enclosing the body for maintaining configuration; a thermal sensor placed in the recess for locating adjacent to the damaged area; and a thermal controller coupled to the sensor and the heater units for automatically controlling the temperature of the heater units.

4 Claims, 4 Drawing Sheets

5,175,414

METHOD AND APPARATUS FOR REPAIRING GLASS-LINED EQUIPMENT BY SOL-GEL PROCESS

CROSS REFERENCE TO RELATED APPLICATION

This application is a divisional of co-pending application Ser. No. 07/529,935 filed May 29, 1990, U.S. Pat. No. 5,053,251.

FIELD OF THE INVENTION

The present invention relates to a method of repairing a damaged portion of a glass layer of glasslined steel equipment and more particularly, to a method and an apparatus for repairing a glass layer by solidifying one or more chemical compounds to form a glass layer at the damaged area by a sol-gel process.

BACKGROUND OF THE INVENTION AND PRIOR ART

Glass-lined steel equipment is manufactured by repeating the steps of applying glass material on a steel substrate of the equipment, heating the entire equipment at a high temperature in a furnace so that a continuous glass layer having a thickness of about 1 to about 2 mm is fused onto the steel substrate.

Glass-lined steel equipment exhibits the mechanical strength of the steel substrate as well as the resistance to corrosion and smoothness of the glass layer, so that glass-lined equipment such as vessels, reactors, and their accessories are widely used in the chemical, pharmaceutical and food industries. However, during service, the glass layer may be damaged locally by an inadvertent operational error that causes the formation of a crack or exfoliation in a portion of the glass layer.

If such damaged portion of the glass layer remains unrepaired for a further period of operation of the equipment, the corrosion of the steel substrate underlying the damage area will be accelerated and the materials contacted by the corroded metals can be contaminated causing a serious problem. It is thus desired to repair, at its place of installation, any local or partial damage to the glass layer as soon as possible.

Typical methods of local repairing of glass-lined equipment include:
(a) a method of using caps or bolts of anti-corrosive tantalum material, in which TEFLON ® packings are employed for sealing between a glass layer and the tantalum caps or bolts (See U.S. Pat. No. 2,631,360); and
(b) a method of applying an anti-corrosive adhesive of an organic resin, such as an epoxy resin or the like;
However, their respective disadvantages are:
(a) for the tantalum repair method, there is difficulty in providing caps or bolts that correspond in configuration to an extended damage area, and the TEFLON ® packings may be degraded causing penetration of impurities; and
(b) for the epoxy resin repair method, the resistance of epoxy resins to heat and solvents are low and inferior so that the further use of the repaired equipment is very limited.

A sol-gel process is known in which an alcohol and water solution of an organo metallic compound, such as a metal alkoxide which serves as a starting material, is heated at a relatively low temperature for solidification (via a dehydrolysis reaction and a condensation reaction to form a glass); thus, glass can be obtained at a much lower temperature than conventional melting process. However, a repair method using the known sol-gel process to repair a damaged glass layer requires a considerable length of time for sufficient heating for the required hydrolysis and condensation, and the generation of glass. Further, the known sol-gel process produces considerable shrinkage during solidification that often causes a crack or exfoliation in the formed glass layer. In order to produce a glass layer in accordance with the known sol-gel process without cracking, the formed glass layer should have a thickness of at least about 1 um and solidification requires a period of time of about one month. The cracking during solidification should be eliminated for satisfactory repair.

It is also understood that in the known sol-gel process, the higher the temperature for heating, the more the hydrolysis and condensation reactions of the repair agent are accelerated, to cause a resulting solid to be more closely bonded.

The heating of the repair agent should be effected at a temperature of less than but approximate to 350° C., which is about an upper limit, allowing a stress on the glass layer to remain without shifting from compression to tension due to the difference in thermal expansion coefficients between the steel substrate and the glass layer.

It is also known that for the purpose of heating a resin repair agent within a small space in glass-lined steel equipment, such as a reaction vessel, a hot-air heater or infrared heating lamp is commonly used. However, in practice, the heat is dissipated beyond the area to be repaired and thus, the thermal efficiency is low. Accordingly, the heat at the resin may not reach approximately 350° C. and the working conditions in the equipment will be degraded due to heat dissipation.

Accordingly, to successfully repair a damaged portion of the glass layer of the equipment, without damage to the glass layer at areas adjacent to the damage or repair point, the following factors are important:
(1) to readily increase the temperature at the area to be repaired, up to about 350° C., and maintain the temperature for a period of time sufficient for solidification of a repair agent;
(2) to keep the thermal dissipation at the repair area to a minimum for repair operations within glass lined equipment; and
(3) to provide a repairing apparatus and method which ensures flexibility so that the repair agent or material can be provided to correspond intimately in configuration to intricate surface configurations of the repair area of the glass layer.

The present invention is thus directed to solving the foregoing problems in providing a method and an apparatus for repairing a damaged portion of glass-lined equipment.

More particularly, some aspects of the present invention include;
(1) avoiding cracking or exfoliation caused by heat shrinkage during solidification of a repair agent by using a repair agent mixed with an inorganic filler material;
(2) developing a glass layer repair material having less voids by means of a void filling process including impregnating a liquid agent into the voids generated in the outer-most surface of the glass layer, so that the voids are filled with the impregnating liquid which is then heated to form a glass;

(3) developing a phosphate glass layer at the bottom or steel-contacting surface of the repair layer, which has a high adhesive strength for the steel substrate;

(4) developing a repairing layer of glass by adhering a sheet of inorganic filler material to the damaged area of a glass layer; and applying a repair agent onto the inorganic filler sheet which is solidified into a glass by a sol-gel process, for the purpose of reducing the number of repeated cycles necessary to form a glass layer of a desired thickness;

(5) developing a smooth surface on an upper surface or top layer of the repair layer, by applying onto the repair layer a repair agent which contains a filler of a fine powder, having a particle size less than about 1 um in diameter, and heating the same; and (6) maintaining the temperature for heating a repair agent within a given range (from about 300° C. to about 350° C.) which causes essentially no tension in the existing glass layer which is thus protected from cracking or falling off in an area adjacent to the damaged area.

SUMMARY OF THE INVENTION

The present invention provides a method of repairing a damaged portion of a glass layer of glass-lined steel equipment by repeated steps of applying a repair agent to a damaged area of the glass layer and then, heating the repair agent for solidification and adherence to the glass by the use of a sol-gel process, until a thickness of a repair glass layer becomes almost equal to the existing glass layer adjacent thereto without generating cracks or exfoliations in the glass.

Also, the present invention provides an apparatus for heating the repair area of a glass layer of glass-lined steel equipment, which comprises:

(1) a flexible thermal insulation sheet body having a recess on the single side thereof;

(2) electric heater units provided in the recess for emitting far infrared rays;

(3) magnets provided adjacent to the recess for securing the body on a wall of glass-lined equipment covering damaged portion to be repaired;

(4) a silica glass cloth enclosing said body for maintaining configuration;

(5) a thermal sensor placed in the recess for locating adjacent to the damaged area; and (6) a thermal controller coupled to the sensor and the heater units for automatically controlling the temperature of the heater units.

The heater apparatus is adapted for readily increasing the temperature at the damage area up to a proper level (about 300° C. to about 350° C.), which ensures no damage to the existing glass layer surrounding the damage area during heating, and maintaining the proper temperature; provides less thermal dissipation and is capable on mounting to any place the inner wall of a glass-lined container.

DETAILED DESCRIPTION OF THE PREFERRED EMBODIMENTS

Embodiment 1

Figure 3:
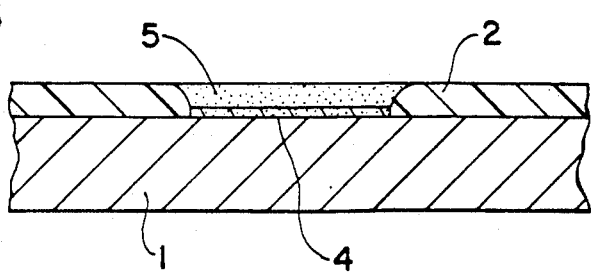
FIG. 3 is a longitudinal cross sectional side view showing the completion of repair on a glass liner layer with the lamination of repair layers.

As shown in FIG. 3, a starting material is used as the repair agent comprising an aqueous solution of one or more organo metallic compounds, e.g. a metal alkoxide, or an inorganic salt.

According to a sol-gel method, the repair agent is processed into a desired chemically bonded form by chemical reaction in the liquid state and after chemical reaction from the sol stage to the gel stage, the repair agent is heated to a degree sufficient for hydrolysis and condensation to form a resulting metal oxide or glass.

Stage 1: Development of lower (primary) repairing layer

1. Cleaning of damaged area

Rust and impurities on the damaged area of a glass layer are removed using polishing papers or the like and any polishing powder and remaining oil that result are washed away with ethanol. The damaged area cleaned then is dried and the surface of an underlying metal substrate is exposed. Simultaneously, the area of the existing glass layer adjacent to the damaged area also is cleaned.

2. Preparation of lower (primary) repair agent

An organo metallic compound, e.g. a metal alkoxide, and an alkaline phosphate are added to an aqueous solution of a phosphoric acid and stirred at 120° C. for distillation. When any alcohol present in the aqueous solution has been evaporated, a viscous and transparent solution of phosphoric glass material (repairing agent) remains.

3. Application

A thin coating of the repairing agent is applied onto the exposed substrate using a brush or the like.

4. Heating

When the repair agent is heated to about 300° C. to about 350° C., the remaining water is evaporated and thus, a lower glass repair layer 4 (FIG. 3) of glass is formed.

At the same time, a chemically reactive layer of iron phosphate is developed between the glass repair layer and the steel substrate.

Figure 2:
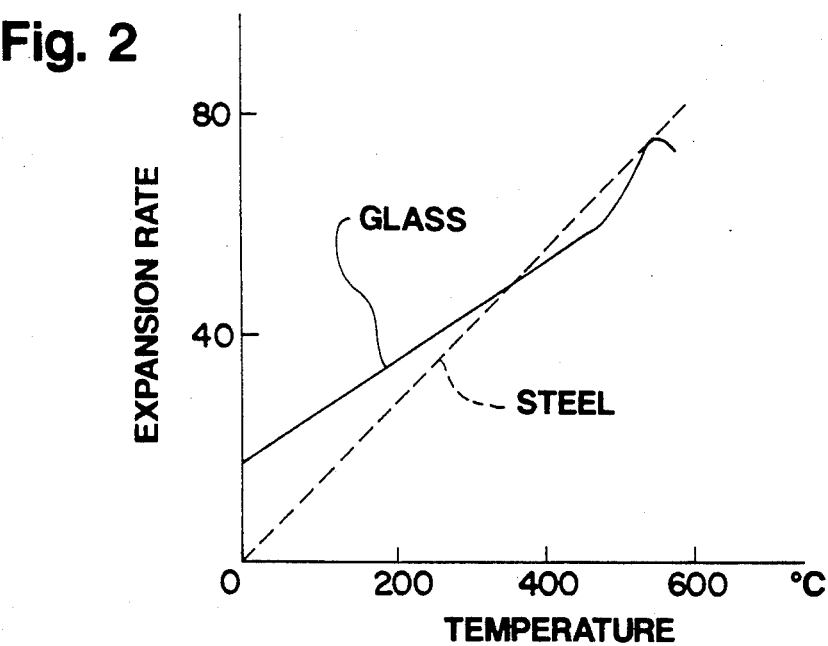
FIG. 2 is a diagram of thermal expansion curves showing the relation between temperature (Y-axis) and expansion rate (X-axis) for a steel substrate and a glass layer.

As shown in FIG. 2, while the existing glass layer 2 is fixedly coated by a conventional melting process to the steel substrate 1, it remains strengthened by a compressive stress applied at room temperature due to the difference in thermal expansion coefficient between the steel substrate 1 and the glass layer 2. As the heating temperature increases, the compressive stress decreases and a tensile stress which may cause cracks builds up at the temperature beyond the intersection point between the two thermal expansion curves of glass and steel (FIG. 2). The temperature at the point of intersection varies depending on the thermal expansion coefficients of the glass layer and the steel. In FIG. 2, this temperature is shown at about 350° C.

According to the present invention, the adhesive or bonding strength between the lower glass repair layer and the steel substrate is increased by the presence of a chemically reactive layer of iron phosphate and, therefore the allowable maximum temperature for heating is about 300° C. to about 350° C. while preventing the existing glass layer from cracking due to the differences in thermal expansion.

To achieve the full advantage of the present invention, the lower glass repair glass layer contains more than about 30 mole % of an alkaline metal oxide.

Stage 2: Development of upper repairing layer

1. Preparation of upper repair agent

Silicon alkoxide, ethanol, water, and acid solution are mixed and stirred at a temperature of about 40° C. for partial hydrolysis of the silicon alkoxide. The solution then is mixed with a glass or ceramic filler material prior to gelation, forming a repair agent. The repair agent which contains a filler material allows the repair layer to avoid significant shrinkage when heated and, thus, to avoid cracking.

The filler material preferably has the properties of improving the resistance to corrosion and increasing the thermal expansion coefficient of the upper repair layer to approximately the same levels as the existing glass layer, and more preferably, the upper layer is durable in the corrosive environment of glass-lined equipment.

As examples of suitable fillers, the filler material can be selected from common ceramic powders (e.g. alumina, titania); single- or multi-crystal inorganic fiber materials; specifically shaped powders, e.g. in spherical or thin strip form, organo metallic compounds (e.g. metal alkoxides), specific inorganic powders produced by liquid or gas phase inorganic salts or the like, and mixtures of the aforementioned materials.

The repair agent also is available to provide additional properties such as conductivity, magnetization, non-adhesiveness, chromaticity, and the like.

It is thus common to select a powder which is inexpensive and easily obtained.

2. Application

The repair agent is applied onto the surface of the lower repair layer coating over the damaged area, with the use of a brush and dried by blowing air on the repair agent for about 10 minutes.

3. Heating

The applied repair agent then is heated to form an upper repair layer 5.

Stage 3: Development of impregnated repairing layer

1. Preparation of impregnating agent

To fill the voids which are generated during solidification between the filler materials in the upper repair layer, due to the effect of dispersible volatilization of ethanol, an impregnating agent is prepared by processing a solution of silicon alkoxide, ethanol, water, and acid in the same manner as the processing of the upper repair agent.

2. Application and heating of impregnating agent

The impregnating agent is applied onto and penetrated into voids in the upper repair layer, and then heated in the same manner as the heating of the lower repair agent.

3. Repeating process

The procedure of impregnation and heating of the inpregnating agent is repeated several times and the upper repair layer 5 is processed for void sealing.

Figure 6:
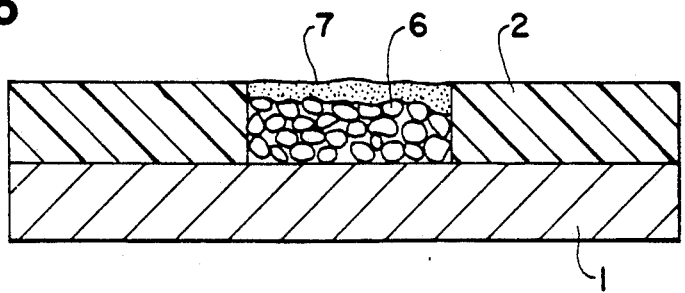
FIG. 6 is a longitudinal cross sectional side view showing the completion of the repair shown in FIG. 5 on a glass layer with a repairing agent mixed with a fine powder of inorganic filler material as a top layer.
Figure 7:
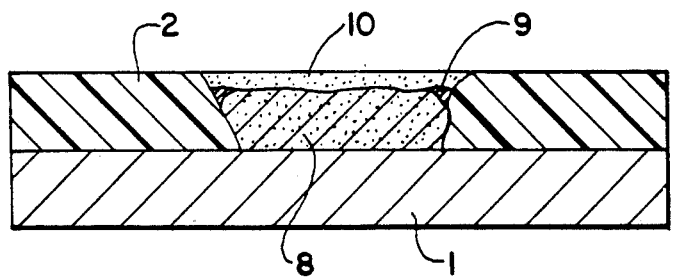
FIG. 7 is a longitudinal cross sectional side view showing the completion of repair on a glass layer with a sheet of inorganic filler material.

The upper repair layer 5 may be developed through the cycle of the proeedures so that the upper repair layer 5 contains less voids and the repaired damage area is approximately equal in thickness to the existing glass layer, as shown in FIGS. 3, 6 and 7.

EXAMPLE 1

Development of Lower Repair Layer

A sodium phosphate an aluminum tri-isopropoxide, an 85% aqueous solution of phosphoric acid, and a proper amount of water were stirred together at 120° C. for distillation and a glass of $21Na_2O-12Al_2O_3-67-P_2O_3$ (mole %) was produced having a thermal expansion coefficient (100 to $130 \times 10^{-7}$/°C.) a bit smaller than that of a steel substrate.

After the components of isopropanol and water have been evaporated, a viscous and transparent solution of phosphate glass (the lower repair agent) was obtained.

A test piece of $2.5 \times 100 \times 100$ mm was fabricated by coating an SS41 steel plate with a JIS R4201 glass lining. A part of the glass layer on the test piece was removed by grinding to have a simulated damaged area of 40 mm in diameter in the center of the glass layer.

The damaged area where the steel plate was exposed was degreased using ethanol and dried with a dry rag.

The lower repair agent was then applied to the exposed steel surface using a painting brush.

The repair agent was heated at 350° C. for 10 minutes. After the remaining water was evaporated from the lower repair agent, a transparent lower repair layer 4 was developed and, simultaneously, a black layer of iron phosphate was generated between the repair layer and the steel base.

DEVELOPMENT OF UPPER REPAIR LAYER

A solution composed of 20 moles of ethanol, 10 moles of silicon tetraethoxide, 5 moles of water, and 1 mole of 85% phosphoric acid was stirred at 40° C. in the atmosphere for 2 hours and then cooled down to room temperature. The resulting solution was provided in which silicon ethoxide was partially hydrolyzed and, thus, found to show no sign of gelation during a onemonth period of sealed storage.

For producing an upper repair agent, the solution was then mixed at a weight ratio of 1:1 with a filler of soda lime glass powder to provide the composition with a thermal expansion coefficient of 130 to $150 \times 10^{-7}$/°C.

The upper repair agent was applied to the test piece over the lower repair layer using a painting brush.

After the upper repair agent was dried at a room temperature for 10 minutes, the upper repair agent was heated by a far infrared heater at 350° C. for another 10 minutes.

Also, a solution composed of 50 moles of ethanol, 10 moles of silicon tetraethoxide, 50 moles of water, and 5 moles of 85% phosphoric acid was stirred at 25° C. in the atmosphere for 2 hours, to provide an impregnating repair agent.

The impregnating agent was penetrated into the surface voids of the upper repair layer of the upper repair agent and heated in the same manner as the heating of the upper repair agent. This procedure was then repeated five times.

Separately, a bar-shaped composite material (a filler) which has a thermal expansion coefficient of 100 to $130 \times 10^{-7}/°C$. can be added to the upper repair agent, and the composite material was prepared by a cycle of the foregoing procedures.

EXAMPLE 2

Exfoliation Test

The test piece fabricated in Example 1 was tested by a series of thermal procedures: 5 hours of heating in boiling water, and 5 hours of cooling at room temperature.

After 6 months, neither falling off nor cracking of the repair glass layer was detected.

EXAMPLE 3

Pinhole Test

A test piece was fabricated in the same manner as in Example 1.

The pinhole test on the repaired area was carried out under the same conditions as the exfoliation test of Example 2, except that a 0.1N hydrochloric acid was used in place of the water.

After 6 months, both the repaired area and the acid solution exhibited no change of color to brown and, thus, no corrosion of the steel substrate by the hydrochloric acid solution was detected.

EXAMPLE 4

Water Durability Test

A test piece of SUS304 stainless steel plate, 2 mm in thickness and 100 mm in diameter was fabricated in the same manner as in Example 1.

After the exposure of the test piece in boiling water for 6 months, the corrosion rate of the glass repair glass layer measured less than 1 mm/year.

EXAMPLE 5

Adhesive Test

A test piece was fabricated, conforming to JIS R4201, from an SS41 steel plate of $6 \times 80 \times 80$ mm in the same manner as in Example 1.

Then, a steel ball of 36.51 mm in diameter (and 200 g in mass) was vertically dropped from 40 cm high onto the repaired portion of the test piece and the adhesiveness of the layer was examined.

The result was that no crack in the steel substrate was detected in the repaired area treated according to the present invention.

For comparison, another test piece was fabricated in which the procedure started from Stage 2 of Example 1 omitting Stage 1. The test piece also was tested in the same manner as the layer of the present invention. A crack to the steel substrate was detected at a probability of 30%.

EXAMPLE 6

An open-type glass-lined tank (JIS R4201: capacity of about 100 liters) was fabricated and about 100 cm² of its glass layer on the interior wall was removed by grinding simulating an extensive damaged area. The damaged area then was repaired and tested in the same manner as the testing of the repair agent Example 1.

The resulting repair exhibited no sign of crack in the existing glass layer around the repaired area.

EXAMPLE 7

The same repair and test as of Example 5 was effected on the curved area of a flange (6 mm in curvature radius) of the tank fabricated in Example 6.

Again, no crack was detected in the existing layer around the repaired area.

The repaired area then was tested for adhesiveness to the steel substrate in the same manner as Example 5 and no crack was detected.

Embodiment 2

As shown in FIG. 3, to repair the damage in a glass layer 2 coated on a steel base 1 of glass-lined equipment, a process is provided wherein a lower repair layer 4 having strong adhesiveness to the steel surface is first developed from a repair agent of phosphate sol-gel glass, and then an upper repair layer 5 having better resistance to corrosion and thermal expansion is coated over the lower layer 4.

Stage 1: Development of lower repair layer

1. Cleaning of damaged area

Rust and impurities on the damaged area of a glass layer are removed using polishing papers or the like and any resulting polishing powder and remaining oil are washed out using ethanol. The damaged area cleaned then is dried and the surface of a metal substrate is exposed. Simultaneously, the area of the existing glass layer adjacent to the damaged area also is cleaned.

2. Lower repair agent

An organo metallic compound, e.g. metal alkoxide, and an alkaline phosphate are added to a phosphoric acid water solution and stirred at 120° C. for distillation. When any existing alcohol has been evaporated, a viscous and transparent solution of phosphoric glass material remains to serve as the lower repair agent. To achieve the full advantage of the invention, the resulting glass formed from the lower repair agent contains more than 30 mole % of an alkaline metal oxide.

3. Application

The lower repair agent is applied onto the damaged area using a brush or the like.

4. Heating

When the damaged area is heated at about 300° to about 350° C., the remaining water is evaporated to form the lower glass repair layer 4.

At the same time, a chemically reactive layer of iron phosphate is developed between the repair glass layer and the steel substrate.

The glass layer 2 is strengthened by a compressive stress applied at room temperature due to the difference in thermal expansion coefficient (See FIG. 2) between the steel base 1 and the glass layer 2. As the heating temperature increases, the compressive stress decreases. When the temperature rises to over 350° C., however, a tension is generated in the glass layer.

Although the phosphate glass having a higher adhesive strength at a higher temperature can be heated up to a high temperature (close to the fusing point of the glass), it should be heated to less than about 350° C. to avoid damage to the adjoining glass layer.

Stage 2: Development of upper repair layer

1. Upper repair agent

An organo metallic compound, e.g. metal alkoxide, and an alkaline phosphate are added to an aqueous solution of phosphoric acid and stirred at 120° C. for distillation. When any alcohol has been evaporated, a viscous and transparent solution of phosphoric glass material is obtained to serve as the upper repair agent. To achieve the full advantage of the present invention, the resulting glass formed from the upper repair agent contains more than about 15 mole % of an alkaline oxide.

2. Application

The upper repair agent is applied onto the lower repair layer formed on the damaged area using a brush or the like.

3. Heating

The repaired area then is heated at about 350° C. for about 10 minutes and after complete evaporation of the remaining water, the upper repair layer 5 of glass is developed.

4. Repeating process

The above procedures 2 and 3 are repeated several times and the upper repair layer 5 is increased in thickness in a laminated arrangement so as to be approximately equal in thickness to the existing glass layer surrounding the repaired area.

Although the upper and lower repair agents are different in chemical composition, they are similar in the process of development and thus, preferably may be increased in thickness by repeating the above-described process steps to achieve a desired thickness.

EXAMPLE 8

A potassium phosphate, an aluminum triisopropoxide, an 85% aqueous solution of phosphoric acid, and water, in amounts appropriate to produce a glass expressed as: $43K_2O-2Al_2O_3-55P_2O_5$ (mole %), were stirred together at 120° C. for distillation.

When the components of isopropanol and water had been evaporated, a viscous and transparent solution of phosphate glass (the lower repair agent) was obtained.

A test piece measuring $2.5 \times 100 \times 100$ mm was fabricated by coating an SS41 steel plate with a JIS R4201 glass lining. The center of the glass layer of the test piece then was removed by grinding to provide a simulated damage area of 40 mm diameter.

After removal of rust and impurities with a polishing paper, the damaged area where the steel substrate was exposed was degreased using ethanol and cleaned with a dry rag. The lower repair agent then was applied onto the exposed steel surface using a paint brush.

The repair agent was heated at 350° C. for 10 minutes. After the remaining water was evaporated from the lower repair agent by heating, a transparent lower repair layer 4 was formed and, simultaneously, a black layer of iron phosphate was generated between the repair layer and the steel base.

Also, the materials listed in Table 1, for producing a glass expressed as $63P_2O_5-10Li_2O-10Na_2O-12Al_2O_3-4B_2O_3-0.5CoO-0.5Y_2O_3$ (mole %) and having a thermal expansion coefficient smaller than the base steel, were stirred at 120° C. for distillation. After removal of organic solvents, e.g. isopropanol, and water, a transparent phosphate solution (the upper repair agent) was obtained.

Table 1

(1) 85% Phosphoric acid
(2) lithium phosphate
(3) sodium diphosphate
(4) aluminum triisopropoxide
(5) tri-n-butyl borate
(6) cobalt octacarbonyl
(7) yttrium octytale Then, the upper repair agent was applied onto the test piece, carrying the lower repair layer, using a paint brush.

The test piece was heated by a heater at 350° C. for 10 minutes.

The application and heating of the upper repair agent was repeated until the upper repair layer becomes equal in thickness to the existing surrounding glass layer.

Exfoliation Test

Using a criterion tester of JIS R4201, the test piece fabricated in Example 8 was tested by a series of heating cycles: 5 hours of heating in boiling water, and 5 hours of cooling at room temperature.

After 3 months of testing, neither falling off nor cracking in the glass repair layer was detected.

EXAMPLE 10

Pinhole Test

A test piece was fabricated in the same manner as in Example 8.

The pinhole test on the repaired area was carried out in under same conditions as the exfoliation test of Example 9, except that 0.1N hydrochloric acid was used in place of the water.

After 3 months of testing, both the repaired area and the acid solution exhibited no change of color to brown and, thus, no corrosion of the steel plate by the hydrochloric acid solution was detected.

EXAMPLE 11

Adhesive Test

A test piece was fabricated from an SS41 steel plate of $6 \times 80 \times 80$ mm in the same manner as in Example 1.

An adhesive test conforming to JIS R4201 was carried out in which a steel ball of 36.51 mm in diameter (and 200 g in mass) was vertically dropped from 40 cm high onto the repaired glass layer of the test piece and the exfoliation on the surface was examined.

The result was that no crack to the steel plate was detected in the repaired area treated according to the present invention.

EXAMPLE 12

Application to Container Structure

An open-type glass-lined tank (capacity of about 100 liters, JIS R4201) was fabricated and about 200 cm² of the glass layer of the interior wall was removed by grinding to simulate an extensive damaged area. The damaged area then was repaired and tested in the same manner as in Example 8 according to the present invention.

The resulting repair exhibited no sign of cracking in the existing glass layer around the repaired area.

EXAMPLE 13

Figure 4:
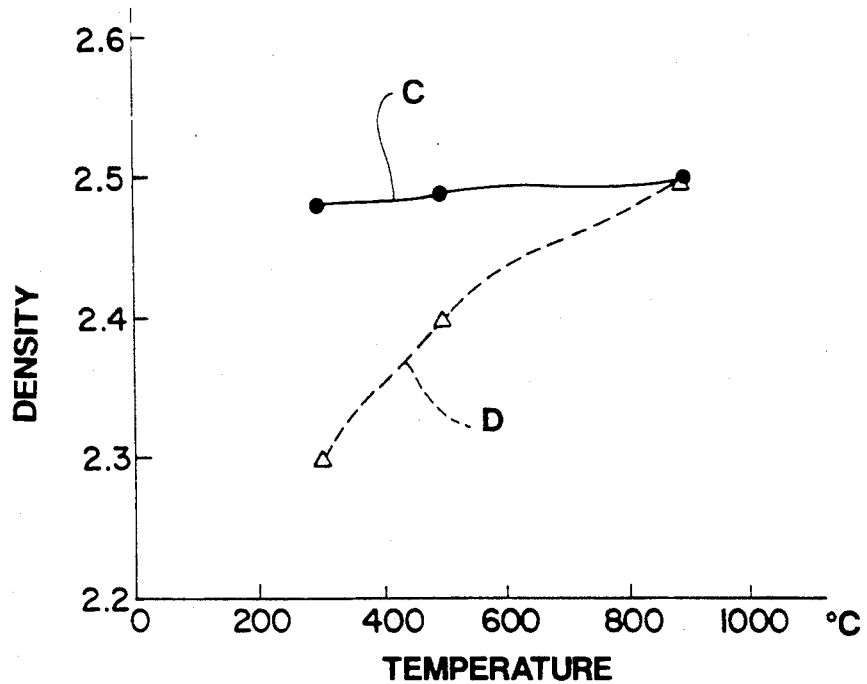
FIG. 4 is a graph showing the relation of temperature (X-axis) to density (Y-axis) between a phosphate glass C according to the present invention and a glass D having the same composition as the glass C and prepared by a conventional melting process.

Shown in FIG. 4 is the comparison of change in the density between the phosphate glass C of the present invention and another phosphate glass D formed from a similar oxide composition by a conventional melting method, in which the improved glass C, having a higher density, is produced at a lower temperature than D.

When an incremental amount of metallic oxide, other than an alkaline oxide is added, the phosphate glass produced by the conventional melting process is enhanced with respect to its resistance to corrosion, but the conventional glass requires a higher temperature for the melting process because of an elevation of its softening point.

The upper repair agent of the present invention employing a metal alkoxide in place of the metal oxide can be turned into a glass form at a lower temperature.

If the metal alkoxide is used as the only starting material, the abrupt shrinkage of the material during heating will cause cracking, and no crack-free development of a thick layer is possible. The improved phosphate glass of the present invention is, however, increased in the density of bridging as the water evaporates, and, therefore, cracking caused by abrupt shrinkage of materials will be avoided.

Embodiment 3

1. Preparation of basic repair agent

A basic repair agent is prepared for producing a multi-component glass expressed as $Na_2O$—$ZrO_2$—$SiO_2$ and having a thermal expansion coefficient equal to that of the existing glass layer adjacent the damaged area, from a mixture of the following ingredients:
(1) sodium ethoxide (Na—OEt)
(2) silicon tetraethoxide (Si—(OEt)$_4$)
(3) zirconium oxide chloride (with 8H$_2$O) (ZrCl$_2$O—8H$_2$O)
(4) ethanol (EtOH—H$_2$O)
(5) water H$_2$O The above-listed ingredients are added to a mixture of ethanol and water in a glass beaker and refluxed at 80° C. under stirring for 1 hr. As a result, a transparent basic agent is obtained.

2. An inorganic powder filler, preferably a glass powder having the same or similar properties as those of the existing glass layer, or a ceramic powder approximate or equal in both the thermal expansion coefficient and resistance to corrosion to the existing glass layer, is added to the basic repair agent, yielding an an upper repair agent.

3. Also, an organo metallic compound, e.g. metallic alkoxide, and an alkaline phosphate are added to a phosphoric acid water solution and stirred, with heating for distillation, so that a transparent lower repair agent is obtained.

Procedures of Repair

1. The damaged area of an existing glass layer of glass-lined equipment, where the steel substrate is exposed, is polished by a grinder and cleaned with an organic solvent.

2. A lower repair agent is applied on the exposed steel surface.

3. After being dried by air for about 10 minutes, the lower repair agent is heated at 350° C. by a heater for another 10 minutes and, upon solidification, a lower repair layer is formed.

4. An upper repair agent then is applied onto the lower repair layer.

5. After being dried by air for 10 minutes, the upper repair agent is heated at 350° C. by a heater for another 10 minutes and, upon solidification, an upper repair layer is formed.

6. The above procedures of Steps 4 and 5 are repeated until the repair layers become equal in thickness to the existing glass layer at the area adjacent to the repair.

7. A basic repair agent is applied onto the upper repair layer for impregnation and then heated in the same manner as described in Step 3. This procedure is repeated five times.

Accordingly, as shown in FIG. 3, in the damaged area of the existing glass layer 2, both the lower repair layer 4, bonded to the steel substrate 1 of the glass-lined equipment, and the upper repair layer 5, composed of the glass expressed as $Na_2O$—$ZrO_2$—$SiO_2$, are produced.

From the basic repair agent according to the present invention, an improved repair layer having a higher adhesive property can be developed in which the alkoxide solution having a high hydrophilic nature is chemically bonded to the hydroxy (OH) groups of an iron oxide generated on the steel substrate.

In addition, the lower repair layer 4 can provide a chemically reactive layer of iron phosphate developed directly on the steel substrate 1, increasing the adhesive strength between the steel substrate 1 and the lower repair layer 4.

In accordance with one important embodiment, the upper repair layer 5 is developed from an upper repair agent that contains a powder filler to provide an improved multi-component composition, so that while voids between particles of the filler are filled with the basic repair agent, further voids caused by shrinkage during solidification are filled and sealed off by repeating the impregnation and solidification procedures of the basic repair agent, thereby avoiding the generation of cracks or pin-holes and ensuring higher durability to water.

While using solely the metallic alkoxide, (e.g. a silicon alkoxide) provides a common silica glass having a poor resistance to alkali, the multi-component glass of the present invention, expressed as $Na_2O$—$ZrO_2$—$SiO_2$ has improved resistance to alkali by the addition of $ZrO_2$. Also, when the filler is selected from materials having a degree of the resistance to corrosion, satisfying the requirements of such glass-lined equipment, the repair layer can be enhanced in its resistance to corrosion.

By addition of $Na_2O$, the thermal expansion coefficient of the repair layer of the $Na_2O$—$ZrO_2$—$SiO_2$ multi-component glass can be increased to $100 \times 10^{-7}$/°C. corresponding to that of the steel substrate, higher than $5 \times 10^{-7}$/°C. of the silica glass layer.

In general, the glass layer of the glass-lined equipment retains a compression stress caused at room temperature by the difference in thermal expansion and, thus, composite strengthened. As the heating temperature rises, the compressive stress decreases and when the temperature exceeds about 350° C., a tension will be generated.

According to the present invention, both the upper and basic repair agents are heated to not more than about 350° C., to ensure sufficient adhesive strength between the repair layers.

EXAMPLE 14

A basic repair agent was prepared for producing a multi-component glass expressed as $Na_2O$—$ZrO_2$—$SiO_2$ and having a thermal expansion coefficient of $100 \times 10^{-7}/°C.$, a bit smaller than that of the steel substrate, using the composition described in Table 2.

TABLE 2

| Composition of basic repair agent (in grams) | |
|---|---|
| sodium ethoxide (Na-O Et) | 0.5 |
| zirconium oxide chloride ($ZrCl_2O$—$8H_2O$) | 1.0 |
| silicon tetraethoxide (Si—$(OEt)_4$) | 8.5 |
| ethanol (EtOH—$H_2O$) | 10.0 |
| water ($H_2O$) | 8.0 |

For the preparation, the above-listed ingredients were added to a mixture of ethanol and water in a glass beaker and refluxed at 80° C. under stirring for 1 hr. As a result, a transparent basic repair agent was obtained.

A glass or ceramic powder filler which has a good resistance to corrosion and a thermal expansion coefficient approximately equal to that of the existing glass layer at the adjacent area, was added to the basic repair agent to form an upper repair agent.

A test piece measuring $2.5 \times 100 \times 100$ mm was fabricated by coating an SS41 steel base with a JIS R4201 glass lining. The test piece then was ground to have a simulated damaged area of 40 mm diameter in the center of the glass layer.

The damaged area where the steel substrate was exposed was degreased using ethanol and cleaned with a dry rag.

The upper repair agent then was applied to the exposed steel surface.

By repeating the above procedure, a desired number of times, a repair layer having a given thickness was formed.

Then, the basic repair agent was applied onto the repair layer for impregnating and heating. Those procedures were repeated five times.

Also, in the same manner, a repair agent was fabricated in a bar form of 4 mm in diameter and 20 mm in length and its thermal expansion coefficient measured at $100 \times 10^{-7}/°C.$ The thermal expansion coefficient is a bit smaller than that of the steel substrate and, thus, the repair layer remains composite strengthened by a resulting compression stress existing at a room temperature.

EXAMPLE 15

Exfoliation Test

Using a criterion tester of JIS R4201, the above test piece was carried out by a series of thermal procedures; 5 hours of heating in boiling water, and 5 hours of cooling at room temperature.

After 6 months, neither failure of nor cracking of the glass repair layer was detected.

EXAMPLE 16

Pinhole Test

A test piece was fabricated in the same manner as in Example 14.

The pinhole test was carried out under the same conditions as the exfoliation test of Example 15, except that 0.1N hydrochloric acid was used in place of the water.

After a 6 month period, both the repaired area and the acid solution exhibited no change of color to brown and, thus, no corrosion of the steel substrate by the hydrochloric acid solution was detected.

EXAMPLE 17

Water Durability Test

A test piece of SUS304 stainless steel plate, 2 mm in thickness and 100 mm in diameter was fabricated in the same manner as in Example 14.

After the exposure of the test piece in boiling water for 6 months, the corrosion rate of the glass repair layer measured less than 0.5 mm/year.

EXAMPLE 18

Adhesive Test

A test piece was fabricated from an SS41 steel plate of $6 \times 80 \times 80$ mm in the same manner as in Example 14.

An adhesive test conforming to JIS4201 was carried out in which a steel ball of 36.51 mm in diameter (and 200 g in weight) was vertically dropped from 45 cm high onto the repaired layer of the test piece and the exfoliation on the surface was examined. As a result, no crack to the steel plate was detected in the repaired area treated according to the present invention.

EXAMPLE 19

Application of Repair Layer to Container Structure

An open-type glass-lined tank (capacity of about 100 liters, JIS R4201) was fabricated and about 100 $cm^2$ of its glass layer on the inner wall was removed by grinding to simulate an extended damage area. The damaged area then was repaired and tested in the same manner as described in Example 15 according to the present invention.

The resulting repair exhibited no sign of cracking in the existing glass layer around the repaired area.

EXAMPLE 20

Application of Repair Layer to a Region of Irregular Configuration in Container Structure The same repair and test of Example 19 was effected on the curved area of a flange (6 mm in curvature radius) of the tank fabricated in Example 19.

Again, no cracking was detected in the existing glass layer around the repaired area.

The adhesiveness of the repaired layer to the steel substrate then was tested in the same manner as Example 18 and as a result, no cracking was detected.

Embodiment 4

A repair agent is prepared by mixing and stirring at 25° C. for one hour a sol-gel solution containing the ingredients listed in Table 3.

TABLE 3

| silicon tetraethoxide | 20 g |
|---|---|
| 85% phosphoric acid | 1 g |

| TABLE 3-continued | |
| --- | --- |
| ethanol | 20 g |
| water | 1 g |

Separately from the ingredients of Table 3, there are provided different types of inorganic ultrafine powders having a particle size less than about 1 μm in diameter, including silicon carbide ultrafine powder (particle diameter <1 μm), silica ultrafine powder (particle diameter: dozens of Angstroms) prepared by a gas phase process, and zirconia spherical ultrafine powder (particle diameter: dozens of Angstroms). Each of the ultrafine powders can be prepared by aggregation of dispersible molecules in gas or liquid phase. A filler powder is selected from the ultrafine powders and added in an amount of about 1% to about 10% by weight to the above sol-gel solution, providing an upper repair agent for the top surface.

On the other hand, an inorganic filler in grit form, and about equal in thermal expansion coefficient and resistance to corrosion to the existing glass layer, is added to the sol-gel solution to provide a lower repair agent.

Figure 5:
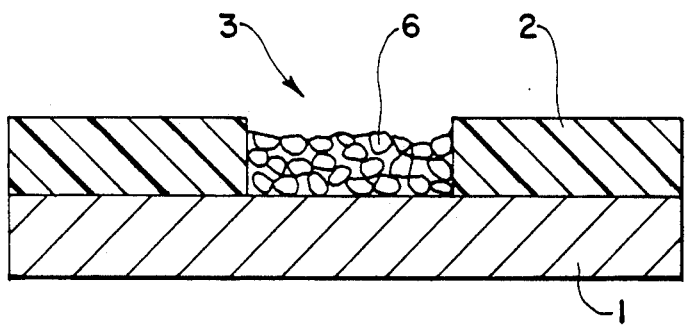
FIG. 5 is a longitudinal cross sectional side view showing the repair of a glass layer with a repair agent mixed with powder of inorganic filler material during the repair process.

As shown in a somewhat exaggerated way in FIG. 5, the damaged area 3 of a glass layer 2 provided on a steel substrate 1 in glass-lined equipment is repaired in a manner according to the present invention, in which the procedures of applying the lower repair agent onto the exposed steel surface, drying the repair agent in air for 30 minutes, and heating the repair agent at about 300° C. to about 350° C. for about 10 minutes are repeated until a lower repair layer 6 becomes almost equal in thickness to the existing glass layer 2 of the adjacent area.

Then, as shown in FIG. 6, the procedures of applying the upper repair agent to the lower repairing layer 6; impregnation; drying in air for 30 minutes; and heating at about 300° C. for about 10 minutes are repeated several times to develop an upper repair layer 7.

EXAMPLE 21

1. Preparation of repair agent

A repair agent was prepared by mixing and stirring at 25° C. for one hour the sol-gel solution containing the ingredients listed in Table 3.

3% by weight of silicon carbide ultrafine powder, having a particle size less than about 1 μm in diameter, was added to the solution, forming the upper repair agent.

Separately, the lower repair agent was prepared by mixing the solution with grains of glass having about the same thermal expansion coefficient and resistance to corrosion as the existing glass layer.

2. Repairing of damaged area of glass layer

A 1 mm-thick glass layer was fused to a 100×100 mm plate of SS41 steel, 3.2 mm in thickness, and treated having a simulated damaged area of about 40 mm in diameter in the center thereof.

The procedure of applying the lower repair agent onto the exposed steel surface, drying it for 30 minutes, and heating it at 350° C. for 10 minutes were repeated until the thickness of a lower repair layer 6 became almost equal to that of the existing glass layer of the adjacent area.

Then, the procedures of applying the upper repair agent onto the lower repairing layer 6, drying it for 30 minutes, and heating it at 350° C. for 10 minutes were repeated several times to develop an upper repair layer 7.

3. Result of repair

The surface of the repaired area treated by the repairing method of the present invention exhibited more than 10 times the smoothness of a repaired (finished) surface with no upper repair layer 7.

It was also found that the adhesion of the container contents to the improved repair layer in the glass-lined equipment was lessened.

Embodiment 5

For repairing damage to a glass layer of glass-lined equipment, a sheet of inorganic material corresponding to the shape of the damaged portion is filled into the portion to be repaired, and then a basic repair agent prepared from a starting material of a sol-gel solution containing a metallic alkoxide and a metal salt is applied onto the inorganic material sheet and heated at about 300° C. to about 350° C. The use of such an inorganic material sheet can reduce the number of repeating procedures in applying the repair agent to the damaged area and heating the same.

As shown in FIG. 7, the damaged area is filled with a sheet of inorganic material 8 corresponding to the shape of the damaged area for repairing the damaged area of a glass layer 2 provided on a sheet substrate 1. The inorganic sheet 8 may be of glass cloth woven from long glass fibers, nonwoven fabric of short ceramic fibers, or the like.

A (basic) repair agent of a sol-gel solution to be applied onto the inorganic sheet is prepared by mixing and stirring the ingredients shown in Table 3 at a temperature of 25° C. for one hour.

The repair agent prepared is then applied onto the inorganic sheet, dried by air for 30 minutes, and heated at 350° C. for 10 minutes so as to produce a solidified glass 9. The inorganic sheet 8 is closely placed onto the damaged area, forming a lower repair layer.

Also, an inorganic ultrafine powder, having a particle size less than about 1 μm in diameter, is added to the repair agent for the top layer. The procedures of applying the upper repair agent onto a lower repair layer, drying it with air for 30 minutes, and heating it at about 350° C. for 10 minutes are repeated to form the top layer.

EXAMPLE 22

A basic repair agent was prepared by mixing and stirring the ingredients listed in Table 3 at 25° C. for one hour.

A 1 mm-thick glass layer was fused to a 100×100 mm plate of SS41 steel, 2 mm in thickness, and treated to provide a simulated damaged area of about 40 mm in diameter in the center thereof.

The damaged area was filled with a glass cloth which was approximately equal in shape and properties to the existing glass layer. Then, the procedures of applying the basic repair agent onto the glass cloth, drying it for 30 minutes, and heating it at about 350° C. for 10 minutes were repeated to form a lower repair layer.

Also, an upper repair agent was prepared by adding an ultrafine powder of alumina, having a particle size less than about 1 μm in diameter, to the basic repair agent. The procedures of applying the upper repair agent onto the lower repair layer, drying it for 30 minutes, and heating it at about 350° C. for about 10 minutes were repeated to develop a top layer. The top layer was smooth on the surface and exhibited better resistance against adhesion to the contents of the glass-lined equipment.

The top layer was developed by repeating the above procedures only a few times.

Embodiment 6

Figure 8:
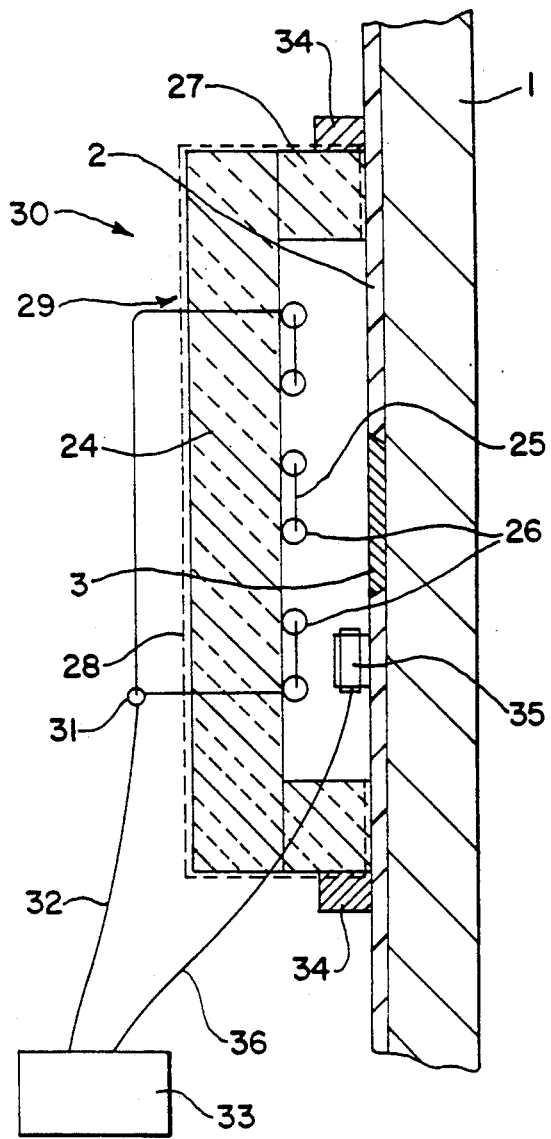
FIG. 8 is a longitudinal cross sectional side view showing the repair with the use of a heater apparatus.
Figure 9:
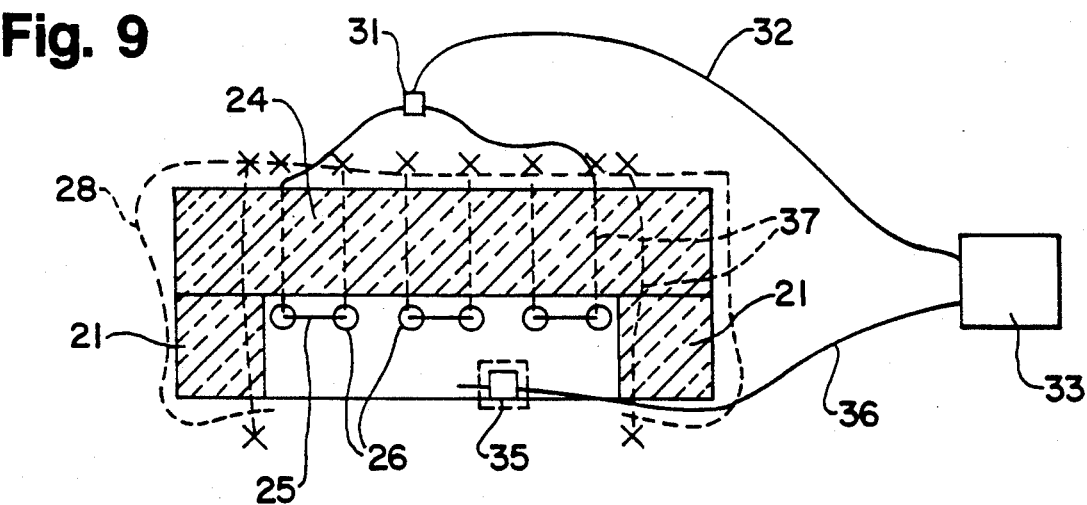
FIG. 9 is another longitudinal cross sectional side view of the heater apparatus of FIG. 8.
Figure 10:
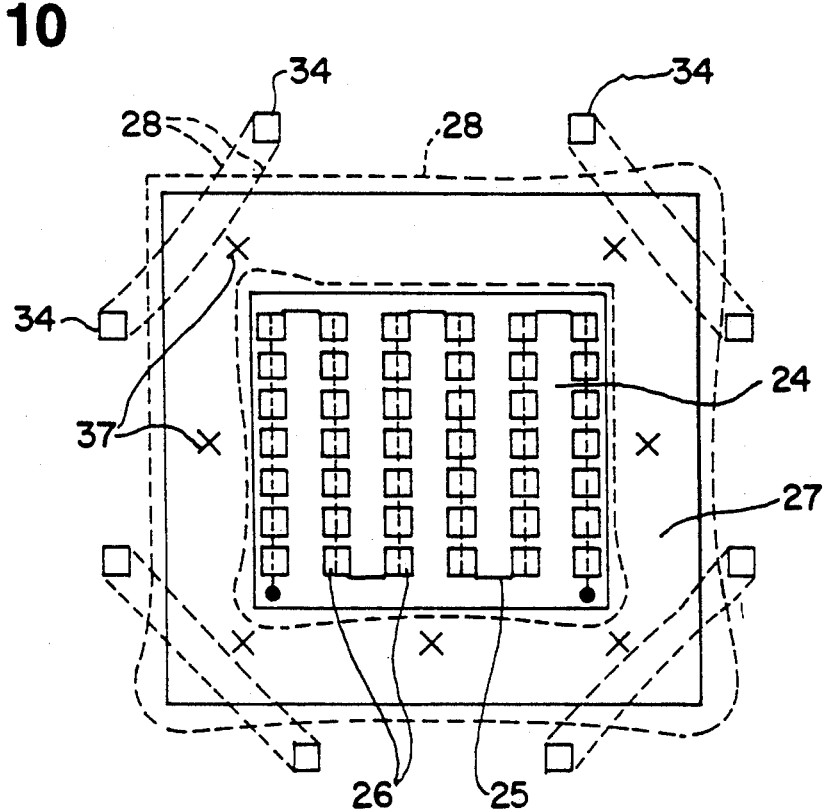
FIG. 10 is a partial bottom view of the heater apparatus of FIGS. 8 and 9.

As shown in FIGS. 8 to 10, a heater unit 30 is provided including a thermal insulation sheet 24 of alumina fiber which has ceramic rings (or far infrared ray emitters) 26 for emitting far infrared rays fitted thereto and incorporated with an electric resistor and heater wire (of nickel chrome) 25. The ceramic rings 26 are arranged in zigzag disposition and fixedly mounted by heat-resistant silica glass strings 37 to the central area of one side of the insulation sheet 24.

A distance retainer 27 of flexible thermal insulation material also is mounted around the insulation sheet 24. Both the sheet 24 and retainer 27 are covered with a silica glass cloth 28 for maintaining the configuration, all of which are integrally bound with silica glass strings, thus constituting an enclosure 29 in the heater unit 30.

Both ends of the nickel chrome heater wire 25 are outwardly extended from the sheet 24 and coupled to a connector 31 of ceramic material, which is in turn coupled by a heat-resistant insulated wire 32 to a thermal controller 33 and a power source (not shown).

For operation of the heater according to the present invention, the heater unit 30 is capable of being placed over the repair area 3 with its distance retainer 27 directly seating on the existing glass layer 2 at the adjacent area and secured in position with rare earth magnets 34 having a powerful magnetic force. Also, the far infrared ray emitter 26 remains equally spaced from the repair area 3. The heater according to the present invention also is applicable to the repair area 3 of a curved glass layer 2 because of the flexibility of the heater unit 30 (See FIG. 1).

While the heater unit 30 is set in place, a thermal measuring instrument (or thermocouple) 35 also is mounted by magnet(s) adjacent to the repair area 3 having a compensation lead line 36 coupled to an exterior thermal controller 33.

When the heater is energized, far infrared rays from the emitters 26 on the nickel chrome wire 25 heat the repair area 3. Simultaneously, the thermal measuring instrument 35 detects a temperature during heating and controls the output of the thermal controller 33 for a fast increase to, and maintenance of a desired temperature. This thermal control can accelerate the dehydration and condensation of the repair agent on the repair area 3 and contribute to optimum repair operation conditions.

The flexible thermal insulation sheet 24 was formed of an alumina fiber sheet, 20 mm thick and 150 mm square, available from Toshiba Monoflux Co. and the distance retainer also was cut out from a sheet of the same material. The effective heating area of the enclosure 29 was 120 $cm^2$. The heater wire 25 was of 600 W/200 V and the far infrared ray emitter 26 was a ceramic ring of 8 mm in inner diameter, 10 mm in outer diameter, and 10 mm in length.

The magnet 34 used was a samarium cobalt magnet, 5×20×25 mm.

In practice, the heater exhibited a temperature rise to 300° C. in about 5 minutes.

Embodiment 7

Figure 1:
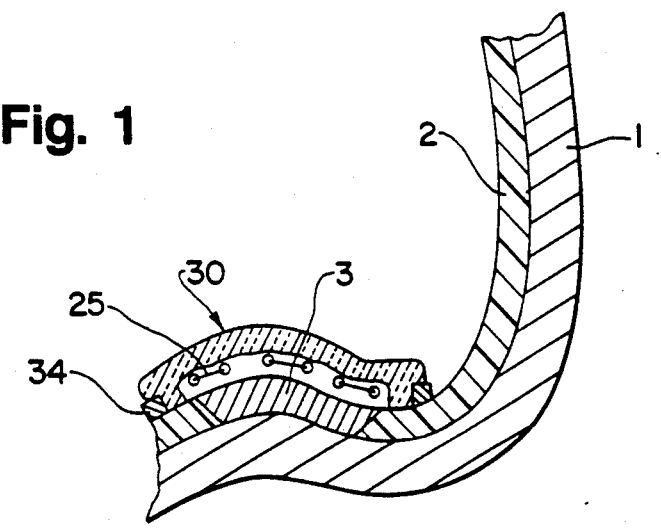
FIG. 1 is a longitudinal cross sectional side view showing the repair of a curved area.

As shown in FIG. 1, a repair agent is applied by a brush or the like onto the repair area 3 where the steel substrate 1 is exposed and has been cleaned with ethanol and dried. The repair agent is preferably a solution of silicon ethoxide, ethanol, water and acid.

Then, the repair agent on the repairing area 3 is heated by the heater 30 to a predetermined temperature (ranging from about 300° C. to about 350° C.) and the temperature is maintained for acceleration of the solidification of the repair agent to form a glass by hydrolysis and condensation, so that a repair layer having a high adhesive or bonding strength is obtained.

EXAMPLE 23

The center region of an inner glass layer 2 of an open-type glass-lined tank (JIS R4201, 1 kiloliter capacity) was removed by grinding to form a simulated damage area, 80 mm in diameter, and to expose a steel substrate 1.

A repair agent (prepared by mixing silicon ethoxide, ethanol, water, and acid) was applied onto the exposed steel surface and heated at 300° C. for 10 minutes.

The result of repair was excellent showing no sign of cracking in the existing glass layer around the repaired area.

EXAMPLE 24

A simulated damage area, about 200 $cm^2$, was created in the inner glass layer of the tank used in Example 23.

The repair was carried out under the same conditions as in Example 23, except that the effective heating area of the heater was 400 $cm^2$ and the power supply was 1 KW/200 V.

The temperature increase to a predetermined degree took about 10 minutes and no crack was detected in the existing glass layer around the repaired area.

EXAMPLE 25

The repair according to the present invention was effected on the curved surface, 6 mm in curvature radius, of a flange of the tank used in Example 23.

The result of repair on such a small curvature radius region was equally good, such that no crack was detected in the existing glass layer around the repaired area.

EXAMPLE 26

The adhesive test for the repair layer to the damaged area in the tank used in Example 23 was carried out.

Conforming to JIS R4201, a steel ball of 36.51 mm in diameter (and 200 g in weight) was vertically dropped from 45 cm high onto the repaired area and the exfoliation on the surface was examined. As a result, no crack to the steel substrate was detected in the repaired area.

We claim:

1. A heater for repairing a damaged portion of a glass layer of a glass-lined vessel and adapted to be operatively connected to overlie said damaged portion of the glass layer of the glass-lined vessel comprising:

a flexible thermal insulation body enclosing said damaged portion of said glass layer and forming a recess between the damaged portion of the glass layer and said insulation body;

means for electrically heating said damaged portion mounted at an inner surface of said insulation body facing said damaged portion and supported in said recess;

a magnet fixed to an outer side of said insulation body adjacent to said recess, said magnet in contact with said vessel and securing said insulating body thereto, thereby enclosing the insulation body about the heating means within the recess to enclose said damaged portion of said glass layer and said heating means such that said heating means overlies said damaged portion of said vessel;

a thermal sensor supported in said recess; and a thermal controller operatively connected to both said sensor and said heater for controlling heat energy emitted from said heater.

2. The heater of claim 1 wherein the thermal insulation body comprises alumina fibers.

3. The heater of claim 1, wherein the means for electrically heating said damaged portion is adapted to heat the damaged portion to a temperature in the range of about 300° C. to about 350° C.

4. The heater of claim 1 wherein the means for enclosing said body comprises a silicate glass cloth.

* * * * *

UNITED STATES PATENT AND TRADEMARK OFFICE
CERTIFICATE OF CORRECTION

PATENT NO. : 5,175,414
DATED : December 29, 1992
INVENTOR(S) : Hara, et al

It is certified that error appears in the above-indentified patent and that said Letters Patent is hereby corrected as shown below:

Column 1, line 14, after "of" delete "glasslined" and substitute therefor -- glass-lined --;

Column 2, line 60, after "include" delete ";" and substitute therefor -- : --;

Column 3, line 59, after "place" insert -- on --;

Column 6, line 29, after "phosphate" insert -- , --;

Column 6, line 63, after "a" delete "onemonth" and substitute therefor -- one-month --;

Column 11, line 46, before "$H_2O$" insert -- ( --.

Signed and Sealed this

Sixth Day of December, 1994

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,175,414
DATED : December 29, 1992
INVENTOR(S) : Hara, et al.

It is certified that error appears in the above-indentified patent and that said Letters Patent is hereby corrected as shown below:

On the title page, before item:[21] insert -- [73] Assignee: Shinko Pantec Co., Ltd., a Japanese corporation.

Column 7, line 38, after "2" insert --,--.

Signed and Sealed this

Eighteenth Day of April, 1995

Attest:

BRUCE LEHMAN

Attesting Officer

Commissioner of Patents and Trademarks